United States Patent
Li

(10) Patent No.: US 8,107,562 B2
(45) Date of Patent: Jan. 31, 2012

(54) COMBINING SOFT DECISIONS IN A WEATHER BAND RADIO

(75) Inventor: Junsong Li, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 949 days.

(21) Appl. No.: 12/002,067

(22) Filed: Dec. 14, 2007

(65) Prior Publication Data

US 2009/0154606 A1 Jun. 18, 2009

(51) Int. Cl.
*H04L 27/06* (2006.01)
(52) U.S. Cl. ........ 375/341; 375/262; 375/316; 375/324; 375/340; 714/794; 714/795; 714/796
(58) Field of Classification Search .................. 375/262, 375/316, 324, 340, 341; 714/794, 795, 796
See application file for complete search history.

(56) References Cited

U.S. PATENT DOCUMENTS

| | | | |
|---|---|---|---|
| 5,418,815 A | 5/1995 | Ishikawa et al. | |
| 5,483,686 A | 1/1996 | Saka et al. | |
| 5,663,989 A | 9/1997 | Fobbester | |
| 6,078,578 A | 6/2000 | Matsumoto | |
| 6,192,089 B1 | 2/2001 | Corleto et al. | |
| 6,526,268 B1 * | 2/2003 | Marrah et al. | 455/186.1 |
| 6,710,715 B2 * | 3/2004 | Deeds | 340/601 |
| 7,050,784 B2 * | 5/2006 | Clark | 455/404.1 |
| 7,486,747 B1 * | 2/2009 | Bagley et al. | 375/324 |
| 7,802,173 B2 * | 9/2010 | Chan et al. | 714/819 |
| 2006/0003728 A1 | 1/2006 | Tuttle et al. | |
| 2006/0109939 A1 | 5/2006 | Ciccarelli et al. | |
| 2009/0028250 A1 * | 1/2009 | Taipale et al. | 375/259 |

OTHER PUBLICATIONS

U.S. Appl. No. 12/002,050, filed Dec. 14, 2007, entitled "A Weather Band Radio Having Digital Frequency Control," by Junsong Li.
U.S. Patent and Trademark Office, Office Action mailed Sep. 9, 2010 with Reply filed Dec. 7, 2010 in U.S. Appl. No. 12/002,050.
U.S. Patent and Trademark Office, Office Action mailed Feb. 10, 2011 with Reply filed May 10, 2011 in U.S. Appl. No. 12/002,050.

* cited by examiner

*Primary Examiner* — Leon Flores
(74) *Attorney, Agent, or Firm* — Trop, Pruner & Hu, P.C.

(57) ABSTRACT

According to one aspect of the present invention, an apparatus is provided to enable weather band radio signals to be received and processed using a digital signal processor (DSP). The DSP can include functionality to implement both frequency modulation (FM) demodulation and weather band data demodulation, i.e., specific area encoding (SAME) demodulation. In one such embodiment, soft decision samples of a SAME message can be combined, and based on a combined result, a hard decision unit can generate a bit value of weather band data.

19 Claims, 7 Drawing Sheets

COMBINING SOFT DECISIONS IN A WEATHER BAND RADIO

BACKGROUND

Weather band radios enable a user to tune into National Oceanic and Atmospheric Administration (NOAA) weather radio (NWR) communications. In the United States, regions have one or more weather radio stations that provide continuous radio broadcasting of weather conditions. This can be especially useful in case of weather-related or other emergency scenarios.

The weather broadcasting occurs in a relatively narrow bandwidth of the radio frequency (RF) spectrum. Specifically, a total of 175 kilohertz (kHz) bandwidth is available at between 160.4 Megahertz (MHz)-160.55 MHz, allowing a minimal 25 kHz for each channel. This narrowband operation can complicate radio design. In contrast, frequency modulation (FM) radio allows for much wider bandwidth for each channel, allowing much greater headroom for design of an FM receiver.

Currently available weather radios have been developed using analog radio technology which, although technically feasible, can be expensive to build, is not readily miniaturized to a small form factor, and has relatively minimal programmable capabilities.

SUMMARY OF THE INVENTION

According to one aspect of the present invention, an apparatus is provided to enable weather band radio signals to be received and processed using a digital signal processor (DSP). In one such embodiment, a receiver may include an analog front end to receive incoming weather band radio signals. The front end can include an analog mixer to mix the incoming weather band radio signals with a controllable oscillator frequency to generate a complex downmixed signal, and an analog-to-digital converter (ADC) to convert the complex downmixed signal to a digital signal.

The digital signal can be provided to the DSP, which can include functionality to implement both frequency modulation (FM) demodulation and weather band data demodulation, i.e., specific area encoding (SAME) demodulation. In one such embodiment, the SAME demodulator may include a combiner to receive a soft decision sample of a SAME message and to combine it with a value in a buffer, depending on which frame of the SAME message is received. The SAME demodulator may further include a hard decision unit to receive the combiner output and generate a bit value.

Yet another aspect of the present invention is directed to a method for receiving a sample of a frame of a SAME message, determining if the sample is of a first frame of the message, writing the sample to a buffer entry if so, otherwise combining the sample with a buffered value in the buffer entry, and writing the combined result back to the buffer. The result can also be provided to a hard decision unit for determination of a hard decision based on the result. In some embodiments, the result is provided to the hard decision unit if the combining is of a third frame sample and the buffered value, otherwise the result is written to the buffer.

Yet another aspect of the present invention is directed to a system that includes a DSP or other programmable processor to handle digital demodulation of weather band signals. The DSP may include hardware that is controlled by software, firmware or combinations to receive an FM demodulated signal and obtain weather band data from the signal. In this regard, the DSP may include an interpolator to receive samples of multiple frames of a message and generate soft decisions therefrom and a combiner to combine the soft decisions of the multiple frames into a hard decision corresponding to a bit of the weather band data. Still further, the DSP may include a timing controller to control a sampling rate of the interpolator based on preamble detection. In one embodiment, the timing controller includes a timing error detector coupled to an output of the interpolator to control the sampling rate to be at a maximum eye opening position and a loop filter coupled to the timing error detector having a variable gain controlled responsive to determination of receipt of the preamble.

DETAILED DESCRIPTION

In various embodiments, incoming weather band radio signals may be digitally processed using flexible digital circuitry such as a digital signal processor (DSP) to provide weather band information, which can include both voice and text information. The text information can be obtained from weather band radio signals encoded according to an audio frequency shift keying (AFSK) modulation scheme, namely a specific area message encoding (SAME) digital message scheme. In various embodiments, an entire weather band radio receiver can be implemented on a single semiconductor die, including both analog and digital circuitry.

Before discussing a detailed implementation of one such radio receiver, a background of the weather radio spectrum and message code format is in order. As described above, weather radio exists at a relatively narrow bandwidth. Currently, in the United States this bandwidth of approximately 175 kHz provides for the presence of up to seven channels each having a 25 kHz bandwidth. The RF carrier modulation for radio communications is narrowband FM with +/−5 kHz maximum deviation. In turn, the sub-carrier modulation of the message information uses AFSK. Different manners of demodulating the SAME message content can be realized. As will be described further below, in various embodiments a soft decision combining mechanism may be provided and used to obtain hard decisions for incoming SAME digital messages in a weather radio system.

Figure 1:
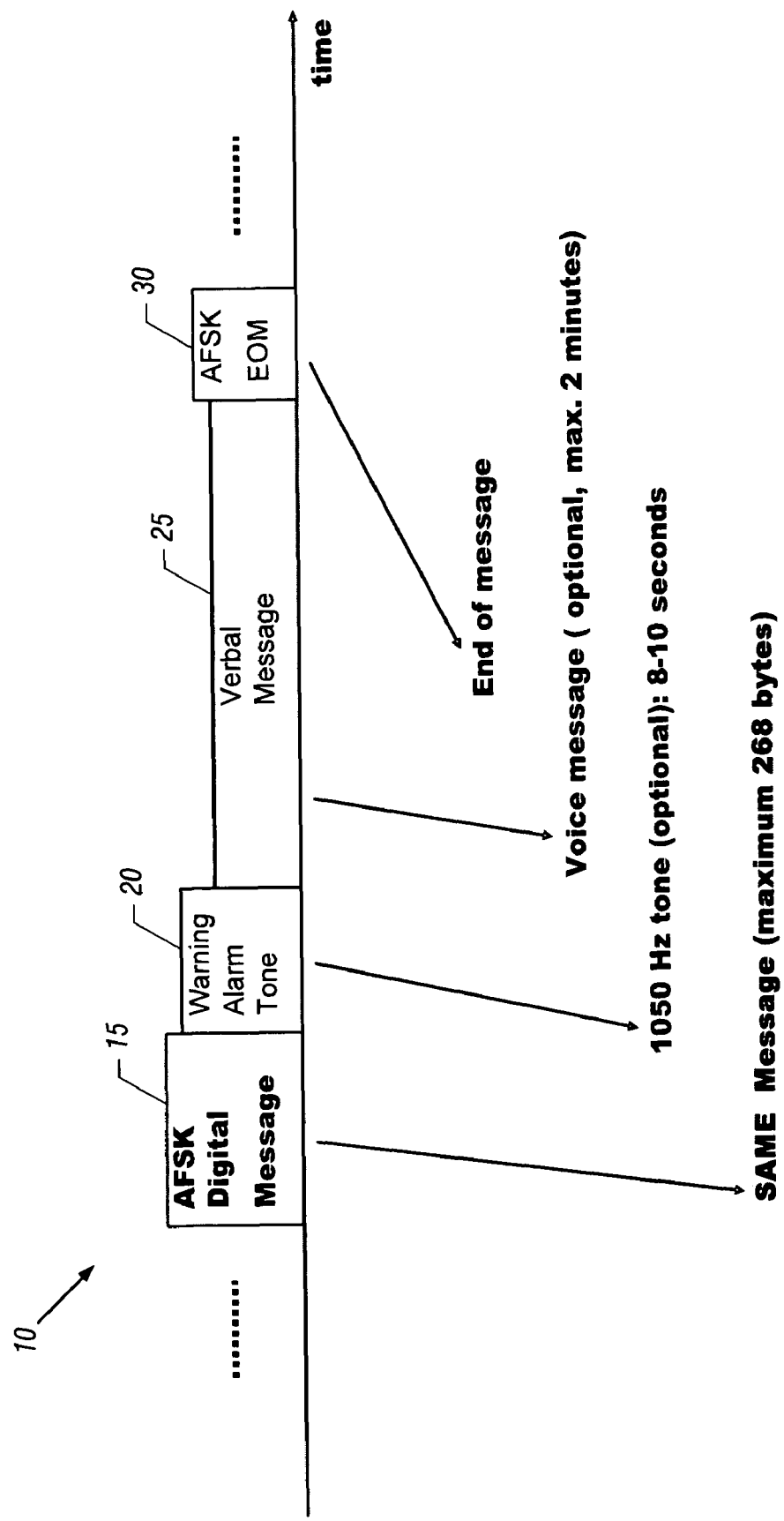
FIG. 1 is a block diagram of a NWR message code format in which communications occur.

Referring now to FIG. 1, shown is a block diagram of a NWR message code format. As shown in FIG. 1, message 10 includes an AFSK digital message 15, which may correspond to a specific area message encoding (SAME) message having a maximum of 268 bytes. In various embodiments, three identical digital messages may be provided in a burst communication, each of which includes the same data repeated three times. Thus this digital message 15 may be demodulated and then further processed to generate a text message suitable for display on a display of a radio or an associated display, e.g., of a video device. The SAME message is phase continuous at bit boundaries, and is transmitted at a bit rate of 520.83 bits per second. Logic zero information is represented at a frequency of 1562.5 Hertz (Hz), while logic one information is represented at a frequency of 2083.3 Hz. The message may have a frequency deviation of between approximately +/−4 kHz to +/−5 kHz. Note that because there is no error control/parity or stop and start bits, the message information is transmitted three times in a row.

Furthermore, the message itself may be separated into a preamble portion and a message portion. The preamble portion may correspond to a predetermined number of bits, e.g., 128 bits, that may be data with very rich bit transitions (i.e., 10101011 repeated 16 times). As will be described further below, these bit transitions may be used to acquire the incoming message of the SAME transmission and identify a synchronization point of the preamble so that the following message can be properly demodulated and processed.

Referring still to FIG. 1, the message code format 10 then may include an optional warning alarm tone (WAT) 20 which may be a 1050 Hz tone of between approximately 8-10 seconds. Following that, a verbal message 25 may be transmitted, which is also optional and may have a maximum message length of approximately 2 minutes. This voice message may have a frequency deviation of +/−1 kHz to +/−4.5 kHz. After this verbal message 25, an AFSK end of message (EOM) indicator 30 may be transmitted to indicate the end of the message.

Figure 2:
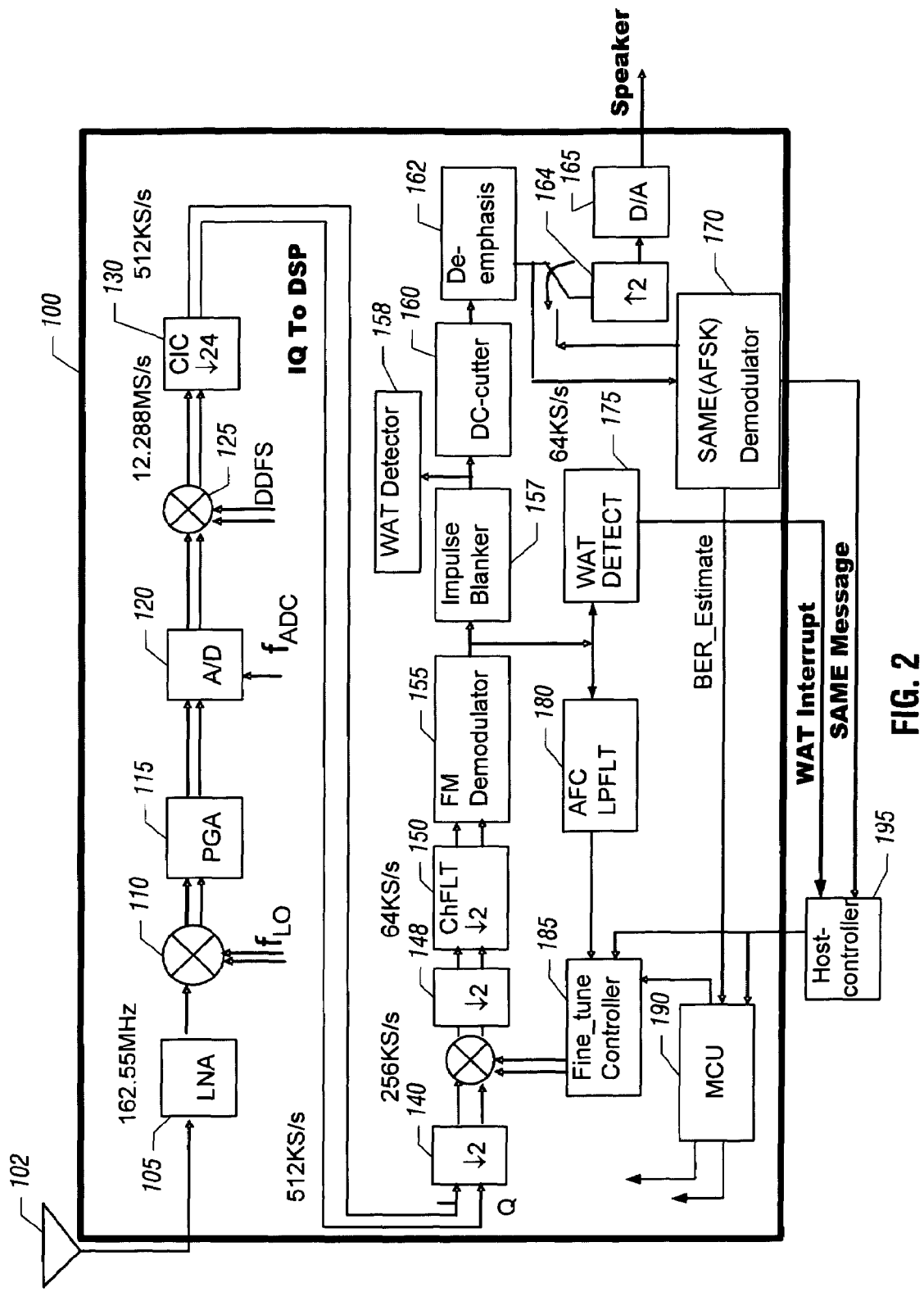
FIG. 2 is a block diagram of a weather band radio receiver in accordance with an embodiment of the present invention.

Referring now to FIG. 2, shown is a block diagram of a weather band receiver 100 in accordance with an embodiment of the present invention. As described above, receiver 100 may be a single die semiconductor device including both analog and digital circuitry. Furthermore, the vast majority of the demodulation and processing of the radio signals can be performed digitally, allowing better sensitivity and channel selectivity. Thus as will be described further below, the majority of the components shown in FIG. 2 may be implemented in a DSP or other programmable processing circuitry. Furthermore, channel fine tuning may be implemented digitally to relax analog frequency accuracy requirements. While not shown for ease of illustration, understand that radio receiver 100 may be a multi-function device including both receive and transmit capabilities, as well as providing functionality for multi-band operation. Specifically, embodiments may be implemented in a single chip device for use with AM, FM and weather band transmissions. That is, the receiver may include a code store (e.g., a nonvolatile memory) including software, firmware, or combinations thereof to enable the DSP or other circuitry to operate in an AM, FM, or weather band mode.

As shown in FIG. 2, receiver 100 may receive incoming weather band radio signals via an antenna 102, coupled to an analog front end of the receiver. The front end may include a low noise amplifier (LNA) 105. In turn, LNA 105 is coupled to an analog mixer 110 which is controlled by a local oscillator (LO) frequency $f_{LO}$. In various embodiments, $f_{LO}$ may be controlled by a microcontroller unit (MCU) 190 which, as shown in the embodiment of FIG. 2, may be an on-chip microcontroller, although the scope of the present invention is not limited in this regard.

As shown in FIG. 2, the downmixed complex outputs from mixer 110, which may be at a low intermediate frequency (IF) (e.g., at approximately 128 kHz) are provided to a programmable gain amplifier (PGA) 115, the outputs of which are provided to an analog-to-digital converter (ADC) 120 that operates at a sampling frequency of $f_{ADC}$ and which may also be controlled by MCU 190, in various embodiments. The digitized information is provided to a direct digital frequency synthesizer (DDFS) 125 which outputs digitized complex baseband data at a rate of approximately 12.288 Megasamples per second (MS/s). These samples are provided to a decimator 130, which may decimate or reduce the sampling rate to a lower rate. Specifically, in the embodiment shown in FIG. 2, decimator 130 may operate to resample the incoming data to a lower rate of 512 kilosamples per seconds (KS/s). The output I and Q data from decimator 130 is thus provided to the DSP of receiver 100, which may generally correspond to all the additional circuitry shown in FIG. 2 (with the exception of digital-to-analog converter (DAC) 165 and MCU 190). As such, embodiments may include an article in the form of a computer-readable medium onto which instructions are written. These instructions may enable the DSP or other programmable processor to perform filtering, demodulation, and other processing in accordance with an embodiment of the present invention.

More specifically, the incoming IQ data is provided to a digital decimator 140, which again reduces the sample rate in half to 256 KS/s. The sampled data is provided to a digital mixer 145 where it is mixed with fine tuning control signals from a fine tune controller 185. The output of digital mixer 145 is decimated in decimator 148 which may reduce the sampling frequency to 64 KS/s, and which in turn is coupled to a channel filter 150. Channel filter 150 may have a variable bandwidth and may be a narrowband channel filter to enable reduced noise effects. Channel filter 150 may be controlled to be a narrow bandwidth channel filter for use in weak signal conditions in order to reduce the noise effect; while a broad bandwidth channel filter may be used at strong signal levels. In one embodiment, MCU 190 measures the signal strength and controls the filter bandwidth accordingly. The filtered output is in turn provided to a FM demodulator 155 for FM demodulation.

The receive chain continues from FM demodulator 155, the output of which is provided to an impulse blanker 157, and then in turn to a DC cutter 160, to a de-emphasis block 162 and to an interpolator 164 to increase the sampling rate of the demodulated FM data (i.e., the voice message data), which is then converted to an analog signal in DAC 165, which in turn is coupled off-chip to a speaker.

Furthermore, the FM demodulated data is also provided to a SAME (AFSK) demodulator 170 which may perform SAME demodulation to thus extract the SAME message for transmission to a host controller 195 to which receiver 100 is coupled. The SAME message may correspond to a text message that can be displayed on a display of a radio or other output device. SAME demodulator 170 may also generate a bit error rate (BER) signal, which can be provided to MCU 190. Further details of a SAME demodulator in accordance with one embodiment of the present invention will be described below.

Note that receiver 100 may include multiple WAT detectors 158 and 175 which can detect a WAT message and provide an appropriate response, e.g., a WAT interrupt signal to host controller 195.

As further shown in FIG. 2, the FM demodulated signal may also be provided to a feedback loop that includes an automatic frequency control (AFC) loop filter 180 and fine tune controller 185, which together may finely control the frequency provided to digital mixer 145 to enable the mixing of the incoming digital data in digital mixer 145 to provide fine frequency tuning and compensate for any noise introduced by step frequency changes that occur in analog mixer 110 as a result of a change to the LO frequency. Thus fine tune controller 185 may provide fine tuning based on process, voltage and temperature (PVT) effects, as well as step frequency changes, to enable small frequency errors. While shown with this particular implementation in the embodiment of FIG. 2, the scope of the present invention is not limited in this regard.

Figure 3:
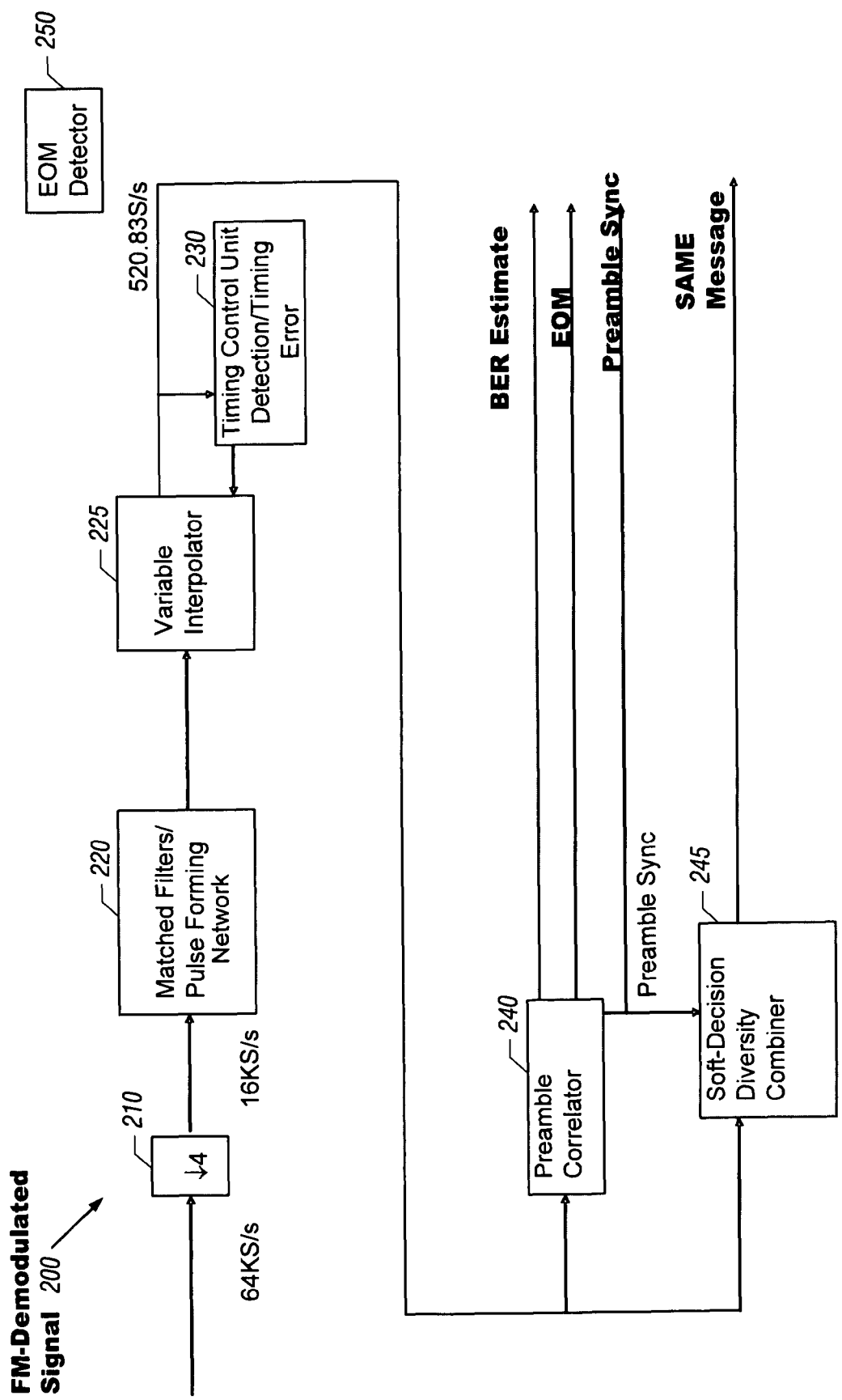
FIG. 3 is a block diagram of a high level view of a SAME demodulator in accordance with an embodiment of the present invention.

Referring now to FIG. 3, shown is a block diagram of a high level view of a demodulator in accordance with an embodiment of the present invention. As shown in FIG. 3, demodulator 200, which may be a SAME (AFSK) demodulator, is coupled to receive incoming FM demodulated signals. In one embodiment, such signals may be received from FM demodulator 155 as shown in FIG. 2 (and through the rest of the demodulated signal chain which in turn is coupled to SAME demodulator 170 of FIG. 2). The incoming demodulated signals are provided to a decimator 210 which may reduce a sampling rate of the incoming signals from 64 KS/s to 16 KS/s, although the scope of the present invention is not limited in this regard. The resampled signals are provided to a matched filter/pulse forming network 220, details of which will be described further below. The combined filtered signals, which may be output at the same sampling rate as the input, are provided to a variable interpolator 225, which is controlled by a timing control unit 230 to provide interpolated samples (i.e., soft decisions) at a rate of 520.83 symbols per second (S/s). Thus the output of variable interpolator 225 may be generated at the bit rate of the SAME messages, i.e., 520.83 bits per second.

Referring still to FIG. 3, the interpolated symbols are provided to a preamble correlator 240, which may continuously run to extract a bursty SAME message within the incoming radio transmission. More specifically, as will be described further below, preamble correlator 240 may determine when a preamble portion of a SAME message, i.e., a 128-bit predetermined data pattern, is received and may generate a preamble synchronization (preamble sync) signal therefrom. Furthermore, preamble correlator 240 may generate a bit error rate (BER) estimate. After a preamble is detected, either a start of message (SOM) or an end of message (EOM) signal can be detected by comparing the received data pattern with the known SOM and EOM patterns. In some embodiments, the SOM signal may be detected in preamble correlator 240, and the EOM signal in EOM detector 250.

The interpolated symbol data from variable interpolator 225 is further provided to a soft decision diversity combiner 245 which, as will be described further below, may combine soft decisions from the three repeated transmissions of the identical SAME message to thus generate a hard decision for each bit of the message. This message information may then be provided, e.g., off-chip, to a host controller or other processor to generate a text message based on this information.

Figure 4:
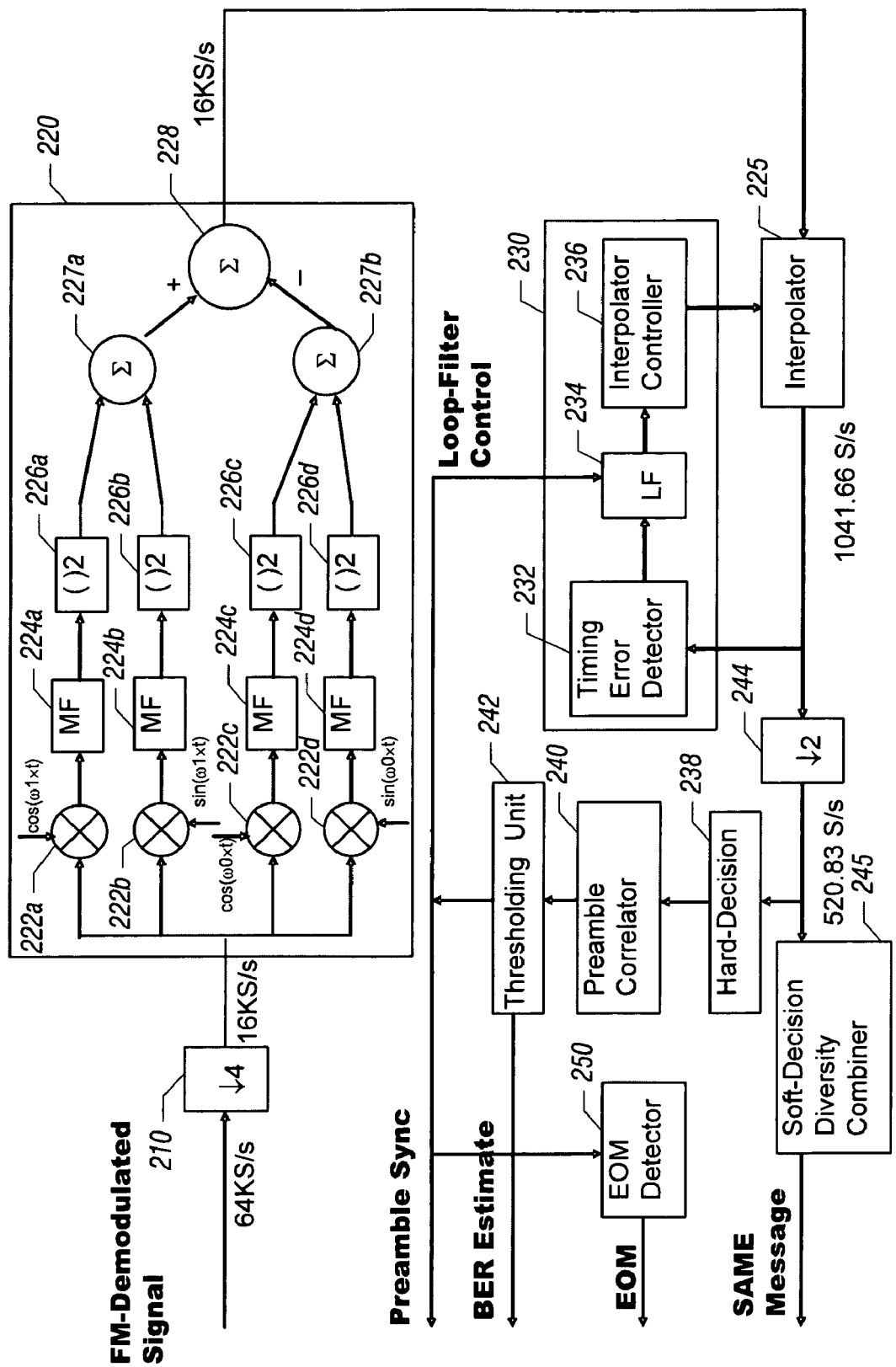
FIG. 4 is a block diagram of a more detailed view of a SAME demodulator in accordance with an embodiment of the present invention.

Referring now to FIG. 4, shown are further details of a SAME demodulator in accordance with an embodiment of the present invention. Shown in more detail in FIG. 4 is the matched filter/pulse forming network 220, which is expanded to show that a plurality of digital mixers $222_a$-$222_d$ are coupled to receive the FM demodulated signal and mix it with a corresponding complex signal. The outputs, which are phase-delayed versions of the input signal, are each provided to a corresponding matched filter $224_a$-$224_d$. The output of each matched filter is in turn is provided to an exponential calculator $226_a$-$226_d$, which performs an exponential function, e.g., raising the incoming filtered value by a power of two, for example. The complex values are provided in pairs to a first pair of combiners $227_a$-$227_b$, which are differentially combined in a final combiner 228 to provide pulse shaping.

Furthermore, the variable interpolation and timing control unit of FIG. 3 is expanded in FIG. 4 to show that timing control unit 230 forms a feedback loop including a timing error detector 232, a loop filter 234, and an interpolator controller 236, which may include a numerically controlled oscillator (NCO) to provide a bit clock to control interpolator 225. As will be discussed further below, loop filter 234 is controlled based on detection of a preamble portion of a SAME message (via the preamble sync signal). Interpolator 225 may operate to resample the incoming signals to a sampling rate of twice that of the actual bit data, i.e., 1041.66 S/s. These resampled symbols are provided to a decimator 244, where they are resampled to the bit rate of 520.83 S/s.

FIG. 4 further shows expanding of the preamble correlation unit. Specifically, a hard decision unit 238 generates hard decisions from the incoming bit stream, which it provides to preamble correlator 240 to determine the presence of an actual preamble having the predetermined bit pattern. Because of the bursty nature of the SAME messages, preamble correlator 240 operates at all times. A correlated output from correlator 240 is provided to a threshold unit 242, which may perform noise thresholding. When a valid preamble is detected, a preamble sync signal is sent to control both loop filter 234 and EOM detector 250. Threshold unit 242 may further generate a BER estimate based on the noise present in the signal.

In the preamble acquisition mode of operation, the loop gain control signal provided to loop filter 234 may act to operate loop filter 234 at a relatively high gain, thus, to achieve a wide closed-loop bandwidth. While the scope of the present invention is not limited in this regard, the gain of loop filter 234 may be increased 4 times in acquisition mode, when compared to tracking mode operation. However, after a SAME message is acquired by determination of the presence of a valid preamble, the loop gain control signal provided to loop filter 234 may cause it to operate at a relatively low gain, thus, resulting in a narrow bandwidth to reduce any jitter or other noise.

Note that timing error detector 232 may be implemented to control sampling of the incoming data at a maximum eye opening position. More specifically, in one embodiment timing error detector 232 may operate on an incoming signal in accordance with the following equation:

$$-([r(n-2)-r(n)]*r(n-1)) \qquad [\text{EQ. 1}]$$

where n−2 and n are at the maximum positive and negative values of the signal, and n−1 is at a zero crossing point, once the control loop has locked.

Embodiments may perform symbol decisions in soft decision diversity combiner 245. Such embodiments may be memory-friendly, as a cost effective DSP implementation of this combining scheme and storage of the incoming message data in a temporary buffer can be realized. Furthermore, combiner 245 may be programmable to operate in different modes such that the resulting output of combiner 245, which corresponds to the SAME message, can be raw message data or a processed result corresponding to a combined message.

Figure 5:
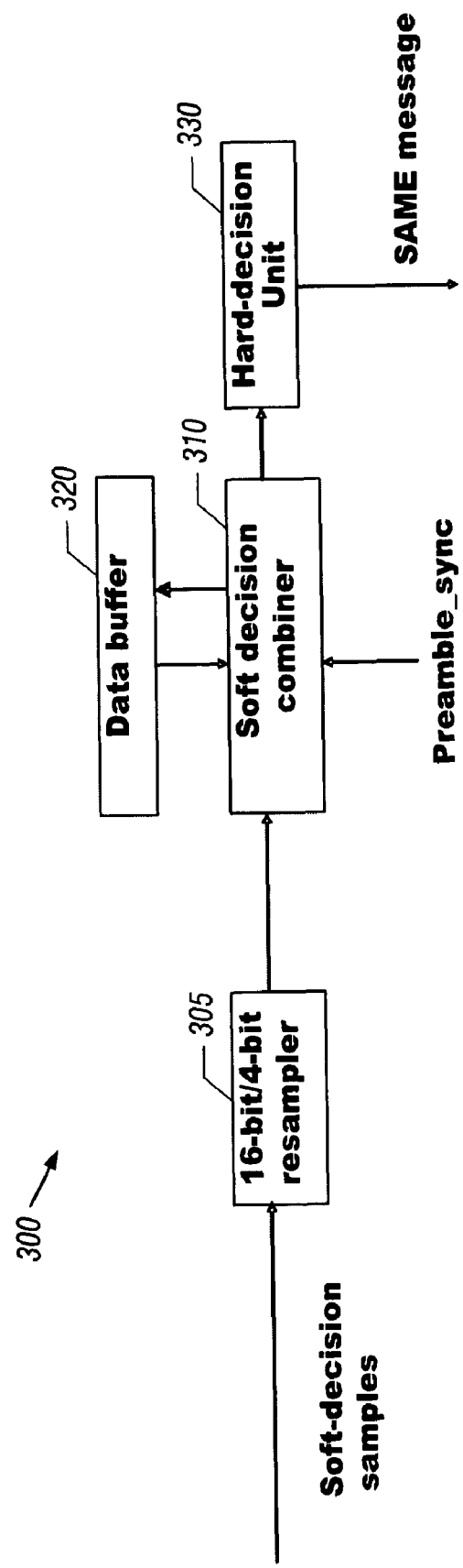
FIG. 5 is a detailed block diagram of a combiner in accordance with one embodiment of the present invention.

Referring now to FIG. 5, shown is a detailed block diagram of a combiner in accordance with one embodiment of the present invention. As shown in FIG. 5, combiner 300 may receive incoming soft decision samples, which may be 16 bit samples (in one embodiment) in a resampler 305. Resampler 305 may resample these 16 bits to generate a 4 bit soft bit decision. This 4 bit, soft bit decision may be provided to a soft decision combiner 310 which is further coupled to receive the preamble sync signal. This signal may indicate which of the three duplicated messages that the sample corresponds. For example, the first preamble sync signal may indicate that the soft decision sample is from the first transmission of the SAME message, i.e., a first frame of the SAME message. If so, soft decision combiner 310 may provide the first sample for storage in a data buffer 320, which may be a temporary storage within the DSP.

Assume that this operation proceeds in the same fashion for storage of each soft decision for the first SAME message, with each 4 bit sample stored in a different entry within data buffer 320. In one embodiment, data buffer 320 may have a size sufficient to store 2144 entries (i.e., for the maximum 268 bytes of a SAME message).

Assume next that the preamble sync signal now indicates incoming soft decision samples to combiner 300 are from the second frame of the SAME message. In this instance, the resampled 4 bit samples provided to soft decision combiner 310 may be combined with the corresponding entries stored in data buffer 320 for the same soft decision sample of the first SAME message. For example, a logical AND operation may be performed within soft decision combiner 310 to thus combine the soft decisions of the first and second frames. This combined sample may replace the original first frame sample in buffer 320, thus enabling memory friendly, cost effective DSP implementation. A similar operation may then be performed between this combined decision stored in data buffer 320 and the third and final corresponding soft decision of the third message frame. Then this final combined soft decision, which may correspond to a logical ANDing of the third soft decision with the combined soft decision (i.e., of the first and second frames), is provided to a hard decision unit 330, which thus generates the hard decision and provides the output as the SAME message.

While described with this particular operation in the embodiment of FIG. 5, the scope of the present invention is not limited in this regard and in other implementations, as mentioned above, raw SAME messages may be provided through soft decision combiner 300 to output hard decisions that can be further processed, e.g., by way of a majority vote. However, using the implementation outlined above, a single bit-to-noise power (Eb/No) improvement of approximately 4.7 dB may be realized as compared to direct hard decision decoding.

Figure 6:
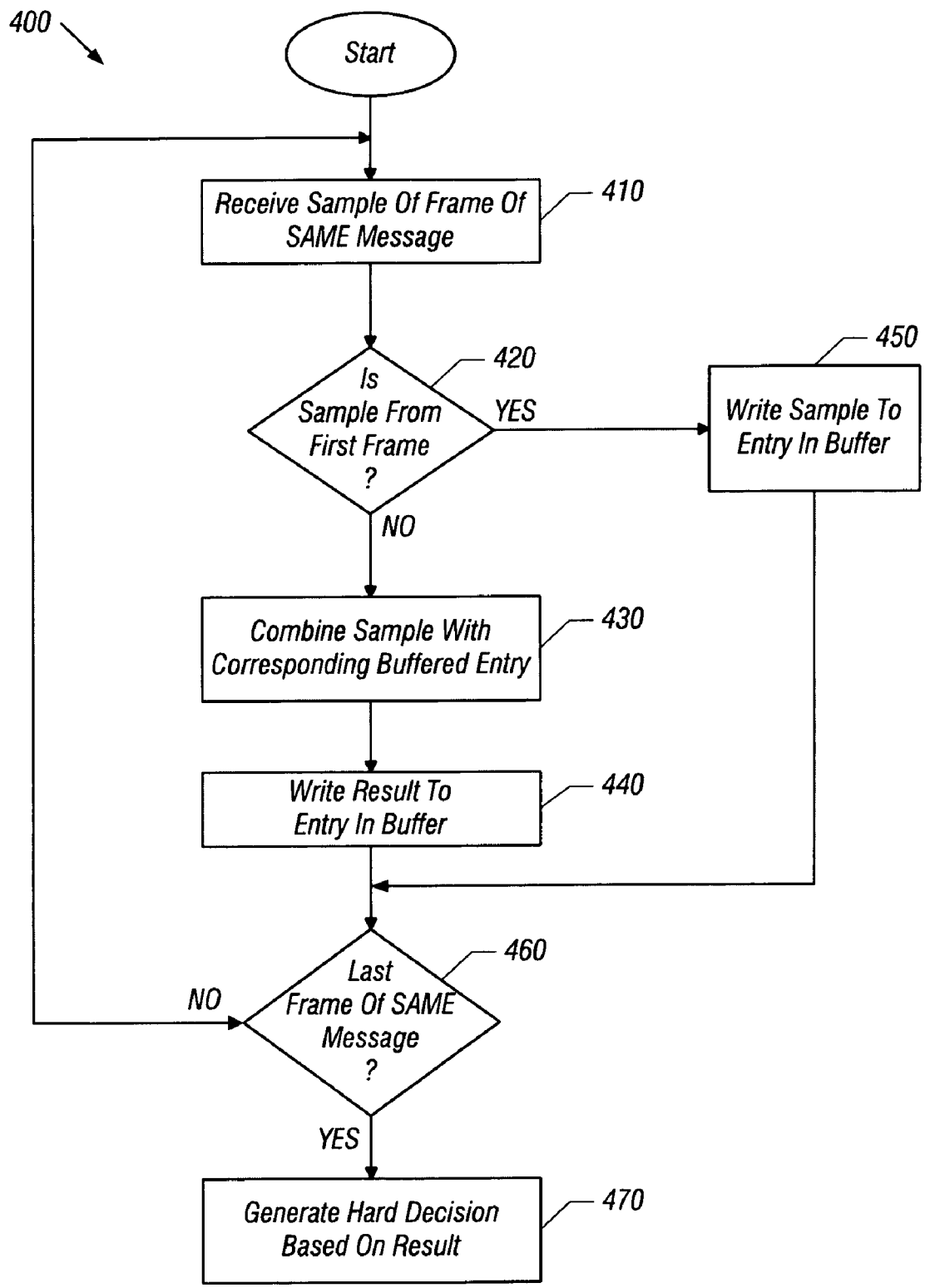
FIG. 6 is a flow diagram of a method in accordance with one embodiment of the present invention.

Referring now to FIG. 6, shown is a flow diagram of a method in accordance with one embodiment of the present invention. As shown in FIG. 6, method 400 may be used to receive and combine soft bit decisions into a hard decision, namely the corresponding bits of a SAME message. Note that the flow shown in FIG. 6 is for a single bit of a SAME message, as received three times (i.e., one bit in each of three frames). Understand that the flow of FIG. 6 may be applied for each bit of the SAME message. As shown in FIG. 6, method 400, which may be implemented in a DSP, e.g., in soft decision diversity combiner 300 of FIG. 5, may proceed as follows.

First, an incoming sample of a frame of a SAME message may be received in the combiner (block 410). For this sample (which, as described above in connection with FIG. 5, may be resampled from a first bit width to a second, smaller bit width), it may be determined whether the sample is from a first frame of a SAME message (diamond 420). If so, the sample may be written to a given entry in a buffer, e.g., a DSP buffer coupled to the combiner (block 450). Control then passes to diamond 460, discussed further below.

If instead the sample received is not from the first frame, control passes to block 430, where the sample may be combined with a corresponding buffered entry. More specifically, assume that the sample is the first sample of a frame. Accordingly a corresponding entry in the buffer that stores the first sample of a previous frame (or a combined result) may be obtained and the combiner can combine the sample with this buffered entry. While different manners of combining these values can occur, in one embodiment a logical AND operation between these values may occur.

Referring still to FIG. 6, the result of this combination operation may be written into the corresponding entry of the buffer (block 440). That is, this result may overwrite the previous value stored in the entry, whether the original sample from a first frame or a previous combination's result, e.g., a combination of a first and second frame. In this way, reduced memory overhead is needed. Note that in some implementations if the combination operation is between a stored sample and a sample of the third incoming frame, the result is not stored back to the buffer and instead is directly output from the combiner for determination of a hard decision.

Control then passes to diamond 460, where it may be determined whether the received sample is from a last frame of a SAME message. In one embodiment, this determination may be made based on a counter value that records how many times the SOM pattern has been received. From this value it may be determined whether the current frame is a first, second or third frame. If the sample is not form the last frame, control passes back to block 410, discussed above.

If the sample was of a last frame of a message, the final result that was generated in the combiner may be used to generate a hard decision (block 470). For example, the combiner may be coupled to a hard decision unit that receives this final result and for each sample, generates a hard decision bit. Thus once the SOM counter reaches 3, indicating that the current SAME message is the third identical message, the hard decision unit begins to operate. The hard decision information, which corresponds to a bit of the SAME message, may be provided off-chip, such as to a host controller or other processor that can generate a text message from this information. Of course method 400 may proceed in similar fashion for each sample of the three frames of a SAME message. While shown with this particular implementation in the embodiment of FIG. 6, the scope of the present invention is not limited in this regard.

Figure 7:
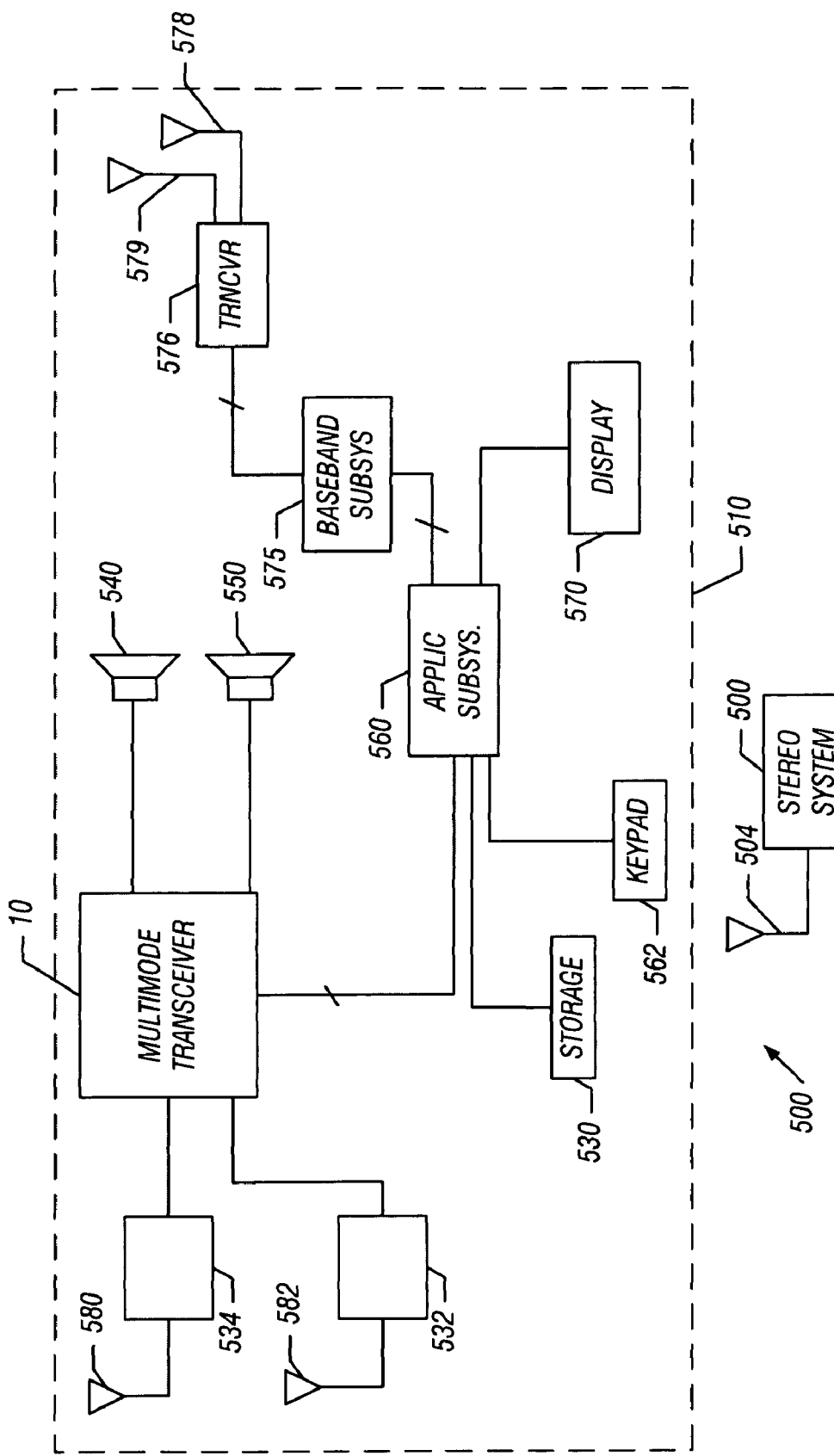
FIG. 7 is a block diagram of a system in accordance with an embodiment of the present invention.

Referring to FIG. 7, in accordance with some embodiments of the invention, a multimode transceiver 10, which may include weather band receiver 100 of FIG. 2, may be part of a multimedia portable wireless device 510, which, in turn, is part of a wireless system 500. As examples, the wireless device 510 may be a multi-function, multi-band radio, a cellular telephone or PDA with the capability of playing music downloads, part of a wireless link between a satellite antenna and a radio receiver, a terrestrial receiver, etc. Of course, wireless device 510 may be a stand alone weather band radio, in other embodiments.

Among its other various functions, the wireless device 510 may store digital content on a storage 530, which may be a flash memory or hard disk drive, as a few examples. The wireless device 510 generally includes an application subsystem 560 that may, for example, receive input from a keypad 562 of the wireless device 510 and display information, such as weather-related information obtained from a SAME message, on a display 570. Furthermore, the application subsystem 560 may generally control the retrieval and storage of content from the storage 530 and the communication of, e.g., audio with the multimode transceiver 10. As shown, the multimode transceiver 10 may be directly connected to speakers 540 and 550 for output of audio data. As depicted in FIG. 7, the multimode transceiver 10 may be coupled by a matching network 534 to a receiver antenna 580 and may be coupled by a matching network 532 to the transmit antenna 582.

Although the wireless device 510 may include the speakers 540 and 550, it may be desirable to play sounds that are generated by the wireless device 510 over a more sophisticated speaker system. Therefore, in accordance with some embodiments of the invention, the wireless device 510, via the multimode transceiver 10, may broadcast content to be played over an FM channel to the receiver of an adjacent stereo system 500 (as an example). As shown, the stereo system 500 includes an RF antenna 504 for purposes of receiving the transmitted content from the wireless device 510.

In accordance with some embodiments of the invention, the wireless device 510 may have the ability to communicate over a communications network, such as a cellular network. For these embodiments, the wireless device 510 may include a baseband subsystem 575 that is coupled to the application subsystem 560 for purposes of encoding and decoding baseband signals for this wireless network. Baseband subsystem 570 may be coupled to a transceiver 576 that is connected to corresponding transmit and receive antennas 577 and 578.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising: a resampler to receive a soft decision sample of a specific area encoding (SAME) message having a first bit width and provide the soft decision sample to a combiner having a second bit width, the second bit width less than the first bit width; the combiner to receive the soft decision sample and to combine the soft decision sample with a value in a corresponding entry of a buffer coupled to the combiner when the soft decision sample is not of a first frame of the SAME message; and a hard decision unit to receive an output of the combiner and to generate a bit value for a bit of the SAME message from the output.

2. The apparatus of claim 1, wherein the buffer comprises a buffer of a digital signal processor (DSP), wherein the combiner and the hard decision unit are of the DSP.

3. The apparatus of claim 2, wherein the combiner is to perform a first logical operation to combine the soft decision sample and the value and store a result of the first logical operation in the corresponding entry of the buffer.

4. The apparatus of claim 3, wherein the combiner is to perform a second logical operation to combine the result and a soft decision sample of a next frame of the SAME message and to output the combined result to the hard decision unit.

5. The apparatus of claim 1, wherein the combiner is to receive a start of message signal and based on the start of message signal determine a frame number associated with the soft decision sample.

6. The apparatus of claim 5, wherein the combiner is to store the soft decision sample to the corresponding entry of the buffer if the soft decision sample is of the first frame.

7. The apparatus of claim 1, wherein the apparatus comprises a SAME demodulator, wherein the SAME demodulator is to demodulate the SAME message from a frequency modulation (FM) demodulated signal obtained from a FM demodulator coupled to the SAME demodulator.

8. A method comprising: receiving a sample of a frame of a specific area encoding (SAME) message with a first bit width in a resampler; determining if the sample is of a first frame of the SAME message; writing the sample to an entry of a buffer if the sample is of the first frame; otherwise providing the sample to a combiner with a second bit width less than the first bit width and combining the sample with a buffered value in a corresponding entry of the buffer; and writing a result of the combining to the corresponding entry of the buffer.

9. The method of claim 8, further comprising providing the result of the combining to a hard decision unit, and generating a hard decision based on the result.

10. The method of claim 9, wherein the hard decision corresponds to a bit of the SAME message.

11. The method of claim 10, further comprising providing the result of the combining to the hard decision unit if the combining is of a third frame sample and the buffered value, otherwise writing the result to the corresponding entry of the buffer.

12. The method of claim 11, wherein writing the result to the corresponding buffer entry overwrites a value stored in the corresponding buffer entry.

13. The method of claim 8, further comprising determining if the sample is of the first frame based on a synchronization signal generated responsive to receipt of a preamble portion of the SAME message.

14. The method of claim 8, further comprising combining the sample with the buffered value in a digital signal processor (DSP) and storing the result in the buffer, wherein the buffer is within the DSP.

15. An apparatus comprising:
a resampler to receive a soft decision sample of a specific area encoding (SAME) message having a first bit width and to resample the soft decision sample to a second bit width, the second bit width less than the first bit width; and
a combiner coupled to the resampler to receive the soft decision sample and to combine the soft decision sample with a value in a corresponding entry of a buffer coupled to the combiner when the soft decision sample is not of a first frame of the SAME message.

16. The apparatus of claim 15, further comprising a hard decision unit to receive an output of the combiner and to generate a bit value for a bit of the SAME message from the output.

17. The apparatus of claim 16, wherein the buffer comprises a buffer of a digital signal processor (DSP), wherein the combiner and the hard decision unit are of the DSP.

18. The apparatus of claim 17, wherein the combiner is to perform a first logical operation to combine the soft decision sample and the value and store a result of the first logical operation in the corresponding entry of the buffer.

19. The apparatus of claim 18, wherein the combiner is to perform a second logical operation to combine the result and a soft decision sample of a next frame of the SAME message and to output the combined result to the hard decision unit.

* * * * *